United States Patent Office 3,436,411
Patented Apr. 1, 1969

3,436,411
PROCESS FOR CLEAVING AN A-RING ETHER GROUP IN 13-ALKYLGONA (AND 8-ISOGONA)-1,3,5(10)-TRIENES AND DELTA-7-, DELTA-8(9)-, AND DELTA-8(9),14(15)-DEHYDRO DERIVATIVES THEREOF
Reinhardt P. Stein, Conshohocken, George C. Buzby, Jr., Philadelphia, and Herchel Smith, Wayne, Pa., assignors to American Home Products Corporation, New York, N.Y., a corporation of Delaware
No Drawing. Continuation-in-part of application Ser. No. 646,961, June 19, 1967, which is a continuation-in-part of application Ser. No. 559,175, June 21, 1966. This application Dec. 28, 1967, Ser. No. 694,036
Int. Cl. C07c *169/00, 171/00*; A61k *17/00*
U.S. Cl. 260—397.5                       18 Claims

ABSTRACT OF THE DISCLOSURE

A-ring hydroxy-substituted 13-alkylgona (and 8-isogona)-1,3,5(10)-trienes and $\Delta^{7}$-, $\Delta^{8(9)}$- and $\Delta^{8(9),14(15)}$-dehydro-analogs thereof are prepared by cleaving A-ring ether groups in the corresponding A-ring aromatic steroids with Grignard reagents at elevated temperatures. The products of the process are hormonally active, especially estrogenically and anti-lipemically active and also are useful as intermediates in the preparation of horomonally active steroids. Among the valuable products of the process is dihydroequilin.

This application is a continuation-in-part of copending application Ser. No. 646,961, filed June 19, 1967, which in turn is a continuation-in-part of copending application Ser. No. 559,175 filed June 21, 1966.

This invention is concerned with the preparation of steroid compounds useful in therapy and as intermediates for therapeutically-useful compounds. More particularly, it relates to a new and useful process for the cleavage of ether functional groups in the A-ring of A-ring aromatic steroids. Compounds prepared by this process are estrogenically- and anti-lipemically-active and are important intermediates in the preparation of biologically active steroids.

Background of the invention.—Those skilled in the art of steroid chemistry often require means to convert an ether group in the A-ring of an aromatic steroid into the corresponding hydroxyl group. For example, estradiol 3-methyl ether often is cleaved to estradiol. Currently, the the accepted processes for the cleavage include reaction with pyridine-hydrochloride or hydrogen halide in acetic acid, or, alternatively, refluxing the ether substrate with sodium amide in piperidine. Recently, important therapeutic activity and value as intermediates has been found to reside in a series of A-ring aromatic steroids which contain double bonds at the 7(8)-, 8(9)- and 8(9),14(15)-positions and in the 8-iso analogs and 8-hydroxy analogs thereof. The processes by which many of these compounds are prepared proceed through compounds containing an ether group in the A-ring, and often it is desired to cleave this to a hydroxyl group. Unfortunately, with the classical reagents mentioned above, the desired products are not obtained. Mostly, the substrates undergo further rearrangements in the presence of acidic reagents, or with basic reagents there are observed complicating isomerizations and dehydrogenations. It would therefore be of substantial benefit to provide a simple method of preparing compounds which are inaccessible by the usual methods. Such a means would permit, for example, the cleavage of dihydroequilin 3-methyl ether to dihydroequilin, a compound of recognized and substantial therapeutic use. It has now surprisingly been found that, with the use of an organo metallic halide reagent and careful selection of reaction conditions, such a cleavage can be accomplished with aromatic steroidal ethers, labile under all other known conditions.

It is, accordingly, a primary object of this invention to provide means to cleave A-ring ether groups in A-ring aromatic steroids.

It is a further object to provide a means to cleave A-ring ether groups in that class of A-ring aromatic steroids which contain acid-labile and base-labile functional groups and unsaturated linkages.

It is another object of the instant invention to provide means to obtain A-ring hydroxy-substituted, A-ring aromatic steroids useful for their estrogenic and anti-lipemic properties.

Description of the invention.—These and other objects of this invention are readily obtained by practice of the instant invention which is, in essence: a process for the preparaton of an A-ring hydroxy-substituted 13-alkylgona (and 8-isogona)-1,3,5(10)-triene of the formula

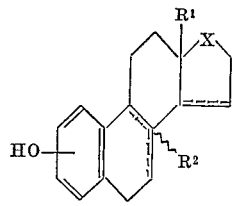

and the $\Delta^{7}$-, the $\Delta^{8(9)}$-, and the $\Delta^{8(9),14(15)}$-dehydro-analogs thereof, wherein
  $R^1$ is (lower)alkyl and X is hydroxymethylene,
  $R^2$ is hydrogen or hydroxy, the symbol (ʓ) indicates α- or β-configuration, and the broken lines indicate unsaturation in said analogs, which comprises cleaving the A-ring ether group of a corresponding aromatic steroidal ether compound of the formula:

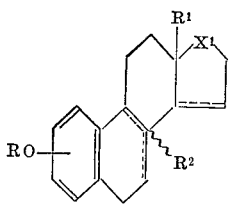

wherein
  $X^1$ is hydroxymethylene or (lower)acyloxymethylene,
  $R^1$ and $R^2$ are as defined above and R is (lower)alkyl or cyclo(lower)alkyl, by heating said steroidal ether with a Grignard reagent at temperatures above the range of from about 80° C. to about 100° C., until cleavage of the A-ring ether group is substantially complete, and recovering said A-ring hydroxy-substituted compound.

Special mention is made of a number of important embodiments of the instant invention.

These are respectively:

A process as next above defined wherein said Grignard reagent is a (lower)alkyl magnesium halide.

A process as next above defined wherein said (lower)alkyl magnesium halide is methyl magnesium bromide or methyl magnesium iodide.

A process as first above defined wherein said Grignard reagent is methyl magnesium iodide and the heating is carried out at a minimum temperature in the range of from about 140° C. to about 170° C.

A process as first above defined wherein said Grignard reagent is methyl magnesium bromide and the heating is carried out at a minimum temperature in the range of from about 160° C. to about 185° C.

A process as first above defined wherein dl-13-ethylgona-1,3,5(10)-triene-3,17β-diol is prepared by reacting dl-3-methoxy-13-ethylgona-1,3,5(10)-trien - 17β - ol with methyl magnesium iodide at a temperature in the range of from about 145° C. to about 170° C.

A process as first above defined wherein dl-13-ethyl-8α-gona-1,3,5(10)-triene-3,17β-diol is prepared by reacting dl - 3 - methoxy - 13 - ethyl-8α-gona-1,3,5(10)-trien-17β-ol with methyl magnesium iodide at a temperature in the range of from about 145° C. to about 170° C.

A process as first above defined wherein dl-estra-1,3,5(10)-triene-3,8,17β-triol is prepared by reacting dl-3-methoxy-estra-1,3,5(10)-triene - 8,17β - diol with methyl magnesium bromide at a temperature in the range of from about 160° C. to about 185° C.

A process as first above defined wherein dl-estra-1,3,5(10)-triene-3,8,17β-triol is prepared by reacting dl-3-methoxyestra-1,3,5(10)-triene - 8,17β - diol with methyl magnesium iodide at a temperature in the range of from about 145° C. to about 170° C.

A process as first above defined wherein dl-estra-1,3,5(10),8-tetraene-3,17β-diol is prepared by reacting dl-3-methoxyestra-1,3,5(10),8-tetraen-17β-ol with methyl magnesium iodide at a temperature in the range of from about 145° C. to about 170° C.

A process as first above defined wherein d-estra-1,3,5(10),8-tetraene-3,17β-diol is prepared by reacting d(—)-3-methoxyestra-1,3,5(10),8-tetraen - 17β - ol with methyl magnesium iodide at a temperature in the range of from about 145° C. to about 170° C.

A process as first above defined wherein dl-13-ethylgona-1,3,5(10),8-tetraene-3,17β-diol is prepared by reacting dl-3-methoxy-13-ethylgona-1,3,5(10),8-tetraen-17β-ol with methyl magnesium iodide at a temperature in the range of from about 145° C. to about 170° C.

A process as first above defined wherein dl-estra-1,3,5(10),7-tetraene-3,17β-diol is prepared by reacting dl-3-methoxyestra-1,3,5(10),7-tetraen-17β-ol with methyl magnesium bromide at a temperature in the range of from about 160° C. to about 185° C.

A process as first above defined wherein dl-estra-1,3,5(10),7-tetraene-3,17β-diol is prepared by reacting dl-3-methoxyestra-1,3,5(10),7-tetraen-17β-ol with methyl magnesium iodide at a temperature in the range of from about 145° C. to about 170° C.

A process as first above defined wherein d(+)-estra-1,3,5(10),7-tetraene-3,17β-diol is prepared by reacting d(+) - 3-methoxyestra-1,3,5(10),7-tetraen - 17β - ol with methyl magnesium iodide at a temperature in the range of from about 145° C. to about 170° C. This embodiment provides a very valuable product, which is also known as d(+)-17β-dihydroequilin.

A process as first above defined wherein d(+)-estra-1,3,5(10),7-tetraene-3,17β-diol is prepared by reacting d-(+)-3-methoxyestra-1,3,5(10),7-tetraen-17β-ol, formate, with methyl magnesium iodide at a temperature in the range of from about 145° C. to about 170° C.

A process as first above defined wherein dl-13-ethylgona-1,3,5(10),7-tetraene-3,17β-diol is prepared by reacting dl-3-methoxy-13-ethylgona-1,3,5(10),7-tetraen-17β-ol with methyl magnesium iodide at a temperature in the range of from about 145° C. to about 170° C.

A process as first above defined wherein dl-estra-1,3,5(10),8,14-pentaene-3,17β-diol is prepared by reacting dl-3-methoxyestra-1,3,5(10),8,14-pentaen-17β-ol with methyl magnesium iodide at a temperature in the range of from about 145° C. to about 170° C.

In the specification and in the appended claims the term "(lower)alkyl" contemplates saturated hydrocarbon radicals, straight and branched chain, having about 1 to about 6 carbon atoms and includes, for example, methyl, ethyl, n-propyl, i-propyl, n-butyl, t-butyl, n-pentyl, n-hexyl, 3-methylpentyl, and the like. The term "(lower)acyl" contemplates alkanoyl groups, both straight chain or branched, of from about 1 to about 6 carbon atoms and includes, for example, formyl, acetyl, n-propionyl, i-propionyl, n-butyroyl, t-butyroyl, n-pentanoyl, n-hexanoyl, 3-methylpentanoyl, and the like. The term "cyclo(lower)alkyl" contemplates cycloaliphatic radicals of from about 3 to about 6 carbon atoms and includes cyclopropyl, cyclobutyl, cyclopentyl, cyclohexyl and the like. The term "dehydro analogs" contemplates and includes "dehydroxy analogs" of those compounds wherein the substituent in the 8-position ($R^2$ in the parent substance), but for the unsaturation, would be α- or β-hydroxyl.

Starting materials of Formula II herein are commercially available or can readily be prepared by techniques familiar to those skilled in the art. For example, $d(+)$-3-methoxyestra-1,3,5(10),7-tetraen-17β-ol, also known as $d(+)$-17β-dihydroequilin 3-methyl ether, a $\Delta^7$-dehydro compound of Formula II wherein R and $R^1$ are methyl, OR being fixed in the 3-position, and related compounds, are exemplified by R. P. Stein, G. C. Buzby, Jr., and Herchel Smith in copending U.S. patent application Ser. No. 559,175 filed June 21, 1966.

The 3-(lower)alkoxy-13-alkylgona-1,3,5(10)-trien-17β-ols of Formula II are prepared by means exemplified by Gordon Alan Hughes and Herchel Smith in copending U.S. patent application, Ser. No. 534,353, filed Mar. 15, 1966.

The 3-(lower)alkoxy-13-alkyl - 8 - isogona - 1,3,5(10)-trien-17β-ols of Formula II are prepared by means exemplified by Gordon Alan Hughes and Herchel Smith in copending U.S. patent application Ser. No. 461,909, filed June 7, 1965.

The 3-(lower)alkoxy-13-alkylgona-1,3,5(10),7-tetraen-17β-ols of Formula II are prepared by means exemplified by R. P. Stein, G. C. Buzby, Jr., and Herchel Smith in copending U.S. patent application Ser. No. 559,175, filed June 21, 1966.

The 3 - (lower)alkoxy - 13 - alkylgona - 1,3,5(10),8(9)-tetraen-17β-ols of Formula II are prepared by means exemplified by Gordon Alan Hughes and Herchel Smith in copending U.S. patent application Ser. No. 467,419 filed June 28, 1965.

The 3 - (lower)alkoxy - 13 - alkylgona - 1,3,5(10),8(9),14(15)-pentaen-17β-ols of Formula II are prepared by means exemplified by Gordon Alan Hughes and Herchel Smith in U.S. 3,202,686.

The 3 - (lower)alkoxy - 13 - alkylgona - 1,3,5(10)-triene-8(α and β), 17β-diols of Formula II are prepared by means exemplified by R. P. Stein, G. C. Buzby, Jr., and Herchel Smith in copending U.S. patent application Ser. No. 559,175 filed June 21, 1966.

Entirely analogous techniques are used to prepare the corresponding 3-cyclo(lower)alkoxy ethers of Formula II, and the 17-(lower)acyloxymethylene-13-alkylgona-1,3,5(10)-trienes and analogs of Formula II.

Means to obtain the corresponding ethers of Formula II wherein the ether group is fixed at positions 1-, 2- or 4-, comprising condensing a suitably substituted 1-vinyl-1-hydroxytetralin with a 2-alkylcyclopentane-1,3-dione, then cyclizing the secogonane thus obtained are exemplified by Gordon Alan Hughes and Herchel Smith in United Kingdom patent specifications Nos. 1,041,273 and 1,041,275 and references cited therein.

The term "Grignard reagent" used herein and in the appended claims is contemplated in its broadest sense. That is, it includes any one of a group of organic magnesium compounds of the general type $R^3MgY$ wherein $R^3$ is an organic radical and Y a halogen. Illustrative members of the group are shown in many standard reference works, among which particular mention is made of Kharasch and Rheinmuth, "Grignard Reaction of Nonmetallic Substances," Prentice-Hall, Inc., New York, 1954. Important Grignard reagents useful herein are those of theabove formula wherein $R^3$ is (lower)alkyl, (lower)alkenyl, (lower)alkynyl, omega-di(lower)alkylaminoalkyl, cyclo(lower)alkyl, halo(lower)alkyl, halo(lower)alkenyl, halo(aryl), (lower)alkylaryl, (lower)alkenylaryl, (lower)alkynylaryl, halo(lower)alkylaryl, (lower)alkoxyaryl, halo(lower)alkenylaryl, and the like. The aryl radical, which may, for example, be monocarbocyclic, e.g., phenyl, dicarbocyclic, i.e., naphthyl, or tricarbocyclic, i.e., phenanthryl, can be mono-, di-, tri-, tetra- or penta-substituted with the above mentioned substituents. Especially preferred Grignard reagents because of economy and ready commercial availability are (lower)alkyl magnesium halides, especially methyl magnesium iodide and methyl magnesium bromide.

In carrying out the instant process, the steroid of Formula II is treated with the Grignard reagent at elevated temperatures until cleavage of the ether group is substantially complete, followed by cooling and quenching the reaction mixture to obtain on work-up the corresponding aromatic hydroxylated steroid of Formula I. If $X^1$ is (lower)acyloxymethylene group, i.e., a formate ester (formyloxymethylene), it will be converted to hydroxymethylene under the reaction conditions. The temperature at which the reaction is to be carried out is high enough to provide complete cleavage in a reasonable period of time, and from about 80° C. to about 100° C. is usually the minimum temperature range used. The optimum temperature appears to depend on the nature of the Grignard reagent used. "Optimum" here is used in the sense that the cleavage is complete in from about 1 to about 5 hours. With methyl magnesium iodide the optimum temperature appears to be above a minimum in the range of from about 140° C. to about 170° C. With methyl magnesium bromide, on the other hand, temperatures above a minimum of from about 160° C. to about 185° C. are usually preferred. In one convenient manner of proceeding, the steroid of Formula II is mixed with a solution or susupension of an excess of the Grignard reagent in a solvent, such as diethylether or tetrahydrofuran and the mixture is heated under nitrogen in an oil bath to a temperature of above 80–100° C., preferably from about 140° C. to about 185° C. and kept at the elevated temperature for from about 1 to about 5 hours. The reaction mixture then is cooled to room temperature, i.e., about 22° C., then is cooled further by immersion in a cold bath, i.e., Dry Ice-acetone. The excess Grignard reagent is decomposed—the reaction mixture is quenched—by adding tetrahydrofuran and a reagent, such as ethyl acetate. The cold bath is removed and stirring is continued until excess Grignard reagent is decomposed. The product is recovered by any conventional means. One useful general process is to add water and a dilute acid, such as acetic acid, until the mixture is neutralized. Then the product is extracted into a water-immiscible organic solvent, such as ethyl acetate. The extract can be back-washed with water and dried, e.g., over anhydrous sodium sulfate. Removal of the solvent by distillation in a vacuum leaves the product of Formula I as a residue. The product can be purified, if desired, by crystallization—trituration with ether often induces crystal formation—and can be recrystallized from an organic solvent, for example, a lower alkanol, such as methanol or other appropriate solvent, such as ethyl acetate, or from mixtures of a lower alkanol with tetrahydrofuran.

The time and temperature ranges used in describing the aforementioned process steps simply represent the most convenient ranges consistent with carrying out the reaction in a minimum of time without undue difficulty. Thus, reaction temperatures appreciably below these can be used, but their use considerably extends the reaction time. Similarly, reaction temperatures higher than those mentioned can be employed with a concomitant decrease in reaction time, although purity of the product may be somewhat decreased.

The sources for the starting materials of Formula II have been specified hereinabove. Generally, all can be prepared by totally synthetic processes described by Douglas, Graves, Hartley, Hughes, McLoughlin, Siddall and Smith in J. Chem. Soc., 1963, pages 5077–94.

In the product of a total synthesis which has not included a suitable resolution stage the compounds prepared by the invention will be present as racemates. Using a convention approved by Fieser and Fieser, "Steroids," p. 336 (1959), the compounds designated as the *d*-forms are the enantiomers corresponding in configuration at C–13 to that of the natural hormone estrone. The corresponding enantiomorphs are consequently designated the *l*-forms and the racemates the *dl*-forms. Racemates will be depicted by structural formulas which show only the enantiomorphs of the *d*-configuration.

As is mentioned hereinabove, the compounds of Formula I prepared by this process have estrogenic and anti-lipemic activity. This makes them useful to treat conditions in mammals responsive to treatment with estrogenic drugs, such as, for example, menopause, senile vaginitis, kraurosis vulvae, pruritis vulvae and the like. In addition they are useful to lower blood lipid level of mammals and can be used whenever anti-lipemic agents are indicated, such as in the treatment of various hyperlipidaemias or where the incidence of atherosclerosis is to be minimized. The products prepared by the instant process are also useful as intermediates for the preparation of other steroids, such as dihydroequilin as mentioned above, which have hormonal or other useful activities.

The products of Formula I prepared by this invention can be used in association with a pharmaceutically acceptable carrier. They can be formulated in liquid or solid forms, for instance as capsules, tablets, suppositories, powders, dispersible granules, cachets, and the like by combining them with conventional carriers. Such conventional carriers inulude magnesium carbonate or stearate, talc, sugar, lactose, pectin, dextrin, starch, gelatin, tragacanth, methyl cellulose, sodium carboxymethyl cellulose, low melting wax and cocoa butter. Diluents, flavoring agents, solubilizers, lubricants, suspending agents, binders or table-disintegrating agents can be used. Powders or tablets preferably contain 5 or 10 to 99% of the active constituent. The active steroid can be formulated with an encapsulating material with or without other carriers.

Liquid preparations such as solutions, suspension or emulsions can also be used. Such preparations include dispersions in a pharmaceutically acceptable carrier such as arachis oil or sterile water, preferably containing a nonionic surface active agent such as fatty acid esters of polyhydroxy compounds, e.g., sorbitan, aqueous starch in sodium carboxymethylcellulose solutions, aqueous propylene glycol or polyethylene glycol. Thus a water-propylene glycol solution can be used for parenteral injection and aqueous suspensions suitable for oral use can be made by utilizing natural or synthetic gums, resins, methyl cellulose or other well known suspending agents.

The composition can be in unit dose form in which the dose unit is for instance from about 0.1 to about 200 mg. of each active steroid. The unit dose form can be a packaged composition, e.g., packeted powder, vials or ampules or, for example, in the form of capsules, cachets or tablets or any number of these in packaged form. The pharmaceutical compositions can also consist substantially solely of the active steroid when this is in unit dose form. When used for the purposes stated above, the dosage of the compounds will vary with the condition being treated, but in general will be in the range established for estradiol (Merck—Index, Seventh Edition, p. 416 (1960)).

Dihydroequilin, one of the products prepared by the instant process, can be used at a level of 1.35 mg. daily, orally, in menopausal syndrome and from 1.25 to 3.75 mg. or more, daily, for senile vaginitis, kraurosis vulvae or pruritis vulvae, in warm blooded animals of about 70 kilogram average body weight, depending on the tissue response of the individual.

Of course, as will be clear to those skilled in the art, in addition to compounds designated by Formula II, the process broadly can be applied to obvious chemical equivalents thereof but differing therefrom in the sense of having other functional groups attached to the steroid nucleus, whenever such groups do not themselves interfere or become affected by the process, unless, in exceptional instances, this is a desired effect, as for example, the use of 17-keto substrates when it is desired that the product incorporate the function resulting from a reaction of the carbonyl group with the Grignard reagent. Similarly, the steroid nucleus may contain any substitution at positions other than at 8 or 17, as, for example, 16-hydroxyl or 6-methyl. Broadly stated, therefore, useful substrates would be represented by the formula $$R^4-(OR)$$

wherein R is (lower)alkyl or cyclo(lower)alkyl and $R^4$ is a cyclopentanopolyhydrophenanthrene nucleus, with an aromatic A-ring monosubstituted by —OR and which, on cleavage of the —OR group, would provide a product with anti-lipemic and estrogenic activity.

Description of the preferred embodiments.—The following examples are given by way of illustration and are not to be construed as limitations of this invention, variations of which are possible without departing from the scope and spirit thereof. Bath temperatures are indicated for convenience, although as those skilled in the art will recognize, internal temperatures of 15 to 20° C. below bath temperatures can be observed on measurement, depending on the geometry of the apparatus and other factors.

EXAMPLE 1 dl-13-ethylgona-1,3,5(10)-triene-3,17β-diol

Cover dl - 3-methoxy-13-ethylgona-1,3,5(10)-trien-17β-ol (10.0 g.) with 3 molar ethereal methyl magnesium iodide (100 ml.) and heat the reaction under nitrogen to 165° C. (oil bath). Keep the temperature at 165–170° C. for 3 hours, then cool to about 22° C. Cool the reaction further by immersing the flask in a Dry Ice-acetone bath. Quench the reaction by adding tetrahydrofuran and ethyl acetate then stir and remove the bath. Stir to completely decompose the reaction mixture then add water and dilute acetic acid to neutrality. Extract the mixture with ethyl acetate. Wash and dry the extract and remove the solvent in vacuo. Allow the residue to crystallize from ether to obtain the product.

EXAMPLE 2 dl-13-ethyl-8α-gona-1,3,5(10)-triene-3,17β-diol

Cover dl-3-methoxy-13-ethyl-8α-gona-1,3,5(10) - trien-17β-ol (5.0 g.) with 3 molar ethereal methyl magnesium iodide (60 ml.) and heat the reaction mixture under nitrogen to 165° C. (oil bath). Keep the temperature at 165–170° C. for 4 hours, then cool to about 22° C. Immerse the flask in a Dry Ice-acetone bath then add tetrahydrofuran and ethyl acetate. Remove the bath and stir until the reaction is completely decomposed. Add water and dilute acetic acid to neutrality. Extract the mixture with ethyl acetate. Wash, dry and evaporate the extract. Allow the residue to crystallize from ether to obtain the title product.

EXAMPLE 3 dl-Estra-1,3,5(10)-triene-3,8,17β-triol

Add a 3 M ethereal solution of methyl magnesium bromide (100 ml.) to a flask containing dl-3-methoxyestra-1,3,5(10)-triene-8,17β-diol (4.00 g.) and heat the reaction mixture, under argon, to an oil bath temperature of 185° C. Keep the bath at this temperature for 1.5 hours, then allow the reaction to cool. Further cool the flask by immersion in an ice-salt bath, then quickly quench the reaction by the addition of ice-water followed by acidification to pH 7 with dilute hydrochloric acid. Filter and air-dry the yellow solid. Dissolve the yellow solid in tetrahydrofuran, treat with decolorizing charcoal and filter through filter aid. Remove the solvent in vacuo to a dark oil. Dissolve the residue in methylene chloride, cool the flask and scratch with a glass rod to promote crystallization. Filter the resulting yellow prisms to afford 0.33 g. of product; M.P. 163–164° C.;

$$\lambda^{KBr}_{max.} 3.05 \text{ (broad OH)}$$

Further purify a sample (300 mg.) by dissolving in methanol, treating with decolorizing, charcoal and filtering through filter aid. Replace the methanol with ethyl acetate by boiling in the steam bath, then allow to stand to complete crystallization. Filter the white crystalline solid to give 130 mg. of the product; M.P. 186–188° C. (dec.);

$$\lambda^{KBr}_{max.} 3.15\mu \text{ (broad OH)}$$

EXAMPLE 4 dl-Estra-1,3,5(10)-triene-3,8,17β-triol

Cover dl-3-methoxyestra - 1,3,5(10)-triene-8,17β-diol (3.00 g.) with 3 molar ethereal methyl magnesium iodide (50 ml.) and heat the reaction under nitrogen to 165° C. (oil bath). Keep the oil-bath at 165–170° C. for 2.5 hours then cool to about 22° C. Cool the reaction mixture further by immersing the flask in a Dry Ice-acetone bath then add tetrahydrofuran (100 ml.) and ethyl acetate (100 ml.). Remove the bath and stir until the reaction is decomposed. Add water (50 ml.), saturated ammonium chloride (200 ml.) then extract with ethyl acetate. Wash the extract with water, saturate sodium chloride solution then dry over anhydrous sodium sulfate. Filter, remove the solvents in vacuo and dissolve the residue in warm tetrahydrofuran. Treat the solution with decolorizing charcoal, filter through filter aid and remove the solvent in vacuo. Crystallize the residue from chloroform to get 1.15 g. of product; M.P. 221–225° C. Dissolve the product in boiling methanol-tetrahydrofuran (1:1) filter hot through filter aid then boil the solution to low volume and let stand to deposit 0.65 g. of pure product; M.P. 254–256° C.;

$$\lambda^{KBr}_{max.} 2.95 \text{ and } 3.12\mu$$

Analysis.—Calcd. for $C_{18}H_{24}O_3$: C, 74.97; H, 8.39. Found: C, 75.03; H, 8.15.

EXAMPLE 5 dl-Estra-1,3,5(10),8-tetraene-3,17β-diol

Add 3 molar ethereal methyl magnesium iodide (250 ml.) to dl-3-methoxyestra-1,3,5(10),8-tetraen-17β-ol (30.0 g.) and under argon heat the reaction to 165° C. Keep the temperature between 165–170° C. for 2.5 hours. Cool the reaction to about 22° C. then immerse the flask in a Dry Ice acetone bath. Add tetrahydrofuran (500 ml.) and ethyl acetate (300 ml.), remove the bath and stir to fully decompose the mixture. Add water (100 ml.), saturate ammonium chloride solution (400 ml.) then dilute acetic acid to neutrality. Extract the mixture with ethyl acetate, wash the extract with water and saturated sodium chloride solution then dry over anhydrous sodium sulfate. Filter, remove the solvent in vacuo and dissolve the residue in hot tetrahydrofuran. Treat the solution with decoloriz-

EXAMPLE 6

*dl*-Estra-1,3,5(10),8-tetraene-3,17β-diol

To a flask containing *dl*-3-methoxyestra-1,3,5(10),8-tetraen-17β-ol (24.0 g.), add a 3 M ethereal solution of methyl magnesium iodide (350 ml.) and heat the reaction mixture under an atmosphere of argon, to an oil bath temperature of 160° C. Keep the bath at this temperature for 5 hours, then allow the reaction to cool. Cover the reaction mixture with a layer of white mineral oil, then further cool the mixture by immersion in a methanol-ice bath. Decompose the reaction mixture by the addition of ice-water and vigorous mechanical stirring. Acidify the solution with dilute acetic acid, then filter, yellow solid. Dissolve the solid in boiling methanol-ethyl acetate, treat with decolorizing charcoal and filter the solution hot through filter aid. Boil the filtrate to remove methanol, then allow the solution to stand at −10° C. to complete crystallization.

Filter the resulting yellow crystals to give 12.5 g. of the product; M.P. 218–221° C.;

$\lambda_{max.}^{KBr}$ 2.90 and 3.15$\mu$; $\lambda_{max.}^{EtOH}$ 272 m$\mu$ ($\epsilon$ 14,115)

Further purify a sample (0.37 g.) by dissolving in methanol, treating with decolorizing charcoal, filtering through filter aid and replacing the methanol with ethyl acetate by boiling on the steam bath.

Filter the resulting off-white prisms to give 0.20 g. of the pure product; M.P. 215–217° C.;

$\lambda_{max.}^{KBr}$ 2.90 and 3.17 $\mu$; $\lambda_{max.}^{EtOH}$ 275 m$\mu$ ($\epsilon$16,200)

*Analysis.*—Calcd. for $C_{18}H_{22}O_2$: C, 79.96; H, 8.20. Found: C, 79.62; H, 8.16.

EXAMPLE 7

*d*-Estra-1,3,5(10),8-tetraene-3,17β-diol

Cover *d*(−)-3-methoxyestra-1,3,5(10),8-tetraen-17β-ol (15.0 g.) with 3 molar ethereal methyl magnesium iodide (160 ml.) and under argon heat the reaction mixture to 165° C. (oil-bath). Keep the oil-bath temperature at 165–170° C. for 3 hours then cool the reaction to about 22° C. Cool the flask further by immersion in a Dry Ice-acetone bath then add tetrahydrofuran and ethyl acetate. Remove the bath and stir until the reaction is decomposed. Add water, saturated ammonium chloride solution and dilute acetic acid to neutrality. Extract the mixture with ethyl acetate, wash the extract with water and saturated sodium chloride solution then dry over anhydrous sodium sulfate. Filter, remove the solvent in vacuo, dissolve the residue in chloroform and let stand to fully crystallize. Filter to obtain 14.0 g. of the product; M.P. 115–121° C. (loss of chloroform). Further purify a sample (1.5 g.) by treating its tetrahydrofuran solution with decolorizing charcoal, filtering through filter aid and replacing the solvent with ethanol by boiling. Dilute the solution with an equal volume of water, scratch and stand to crystallize. Filter to obtain 0.4 g. of solvated product; M.P. 135–139° C. (loss of water);

$\lambda_{max.}^{EtOH}$ 275 m$\mu$ ($\epsilon$14,900)

[α]$_D$=0 (C=1, dioxane).

*Analysis.*—Calcd. for $C_{18}H_{22}O_2 \cdot \frac{1}{3}H_2O$: C, 78.91; H, 8.24. Found: C, 78.89; H, 8.23.

EXAMPLE 8

*dl*-13-ethylgona-1,3,5(10),8-tetraene-3,17β-diol

Cover *dl*-3-methoxy-13-ethylgona-1,3,5(10),8-tetraen-17β-ol (44.0 g.) with 3 molar ethereal methyl magnesium iodide (400 ml.) and under argon heat the solution to 160° C. (oil bath). Keep the oil bath temperature at 160–165° C. for 3 hours, then allow the reaction to cool to about 22° C. Immerse the flask in a Dry Ice-acetone bath, then add tetrahydrofuran (500 ml.) and ethyl acetate (500 ml.). Remove the bath and stil until the reaction is decomposed. Add water, 10% ammonium chloride solution (500 ml.) and dilute acetic acid to neutrality. Extract the mixture with ethyl acetate then wash the extract with saturated sodium bicarbonate solution, water and with saturated sodium chloride solution then dry over anhydrous sodium sulfate. Filter, remove the solvents in vacuo and triturate the residue with ether. Filter to obtain 35.5 g. of the product, M.P. 177–180° C. Further purify a sample (2.00 g.) by treating a tetrahydrofuran solution with decolorizing charcoal, filtering through filter aid and replacing the solvent with isopropanol. Filter the resulting crystalline solid to obtain 1.78 g. of the product as the isopropanol solvate; M.P. 118–120° C. (loss of isopropanol) then 183–184° C.;

$\lambda_{max.}^{KBr}$ 3.02 and 3.17$\mu$; $\lambda_{max.}^{EtOH}$ 270 m$\mu$ ($\epsilon$ 15,000)

*Analysis.*—Calcd. for $C_{19}H_{24}O_2 \cdot C_3H_8O$: C, 76.70; H, 9.36. Found: C, 76.58; H. 9.07.

EXAMPLE 9

*dl*-Estra-1,3,5(10),7-tetraene-3,17β-diol

Add *dl*-3-methoxyestra-1,3,5(10),7-tetraen-17β-ol (2.00 g.) to a 3 molar ethereal solution of methylmagnesium bromide (70 ml.) and under argon heat the reaction mixture in an oil bath to a bath temperature of 185° C. Keep the reaction at this temperature for 1.5 hours, then allow it to cool to about 22° C. Further cool the reaction in an ice-salt bath and quickly quench the solid with ice-water. Acidify the mixture to pH 7 with 5% hydrochloric acid. Filter the resulting yellow solid and air-dry. Dissolve the solid in tetrahydrofuran, treat with decolorizing charcoal and filter through filter aid. Remove the solvent in vacuo and dissolve the resulting yellow oil in methylene chloride. Filter the resulting yellow solid to afford 0.95 g. of the title product; M.P. 210–213° C. Further purify a sample (0.35 g.) by dissolving it in methanol, adding decolorizing charcoal and boiling, then filtering the solution through filter aid. Replace the methanol with ethyl acetate by boiling on the same bath, then let the solution stand to crystallize. Filter the white, leafy crystals to give 0.20 g. of the pure title product; M.P. 220–222° C.;

$\lambda_{max.}^{KBr}$ 2.95 and 3.20$\mu$

*Analysis.*—Calcd. for $C_{18}H_{22}O_2$: C, 79.96; H, 8.20. Found: C, 79.68; H, 8.13.

EXAMPLE 10

*dl*-Estra-1,3,5(10),7-tetraene-3,17β-diol

Cover *dl* - 3 - methoxyestra-1,3,5(10),7-tetraen-17β-ol (4.40 g.) with 3 molar ethereal methyl magnesium iodide (60 ml.) and under nitrogen heat the reaction to 165° C. (oil-bath). Keep the temperature at 165–170° C. for 2 hours to cool to about 22° C. Cool the flask further by immersion in a Dry Ice-acetone bath. Add tetrahydrofuran and ethyl acetate then remove the bath. Stir until the reaction mixture is decomposed. Add water, ammonium chloride solution and dilute acetic acid to neutrality. Extract the mixture with ethyl acetate, wash the extract with water and saturated sodium chloride solution then dry over anhydrous sodium sulfate. Filter, evaporate the solvent in vacuo and dissolve the residue in tetrahydrofuran. Treat the solution with decolorizing charcoal, filter through filter aid and remove the solvent in vacuo. Crystallize the oil from chloroform to obtain product, 3.60 g.; M.P. 213–215° C.;

$\lambda_{max.}^{KBr}$ 2.93 and 3.19$\mu$

EXAMPLE 11

$d(+)$-estra-1,3,5(10),7-tetraene-3,17$\beta$-diol, ($d(+)$-17$\beta$-dihydroequilin)

Add a 3 M ethereal solution of methyl magnesium iodide (200 ml.) to $d(+)$-3-methoxyestra-1,3,5,(10),7-tetraen-17$\beta$-ol (15.7 g.). Heat the reaction mixture under argon to 165° C. Keep the temperature at 165–170° C. for 3 hours. Cool the reaction mixture to room temperature, then cool to −78° C. by immersion in a Dry Ice-acetone bath. Add tetrahydrofuran (400 ml.) and stir to partly decompose the reaction, then add ethyl acetate (200 ml.) and remove the bath. Continue stirring as the reaction mixture warms up and decomposes. Small quantities of water (10–20 ml.) may be occasionally added using the Dry Ice bath to keep the temperature well below room temperature. When the reaction mixture is completely decomposed, add saturated ammonium chloride solution then dilute acetic acid solution to neutrality. Extract the mixture well with ethyl acetate. Wash the extract with water and with saturated sodium chloride and dry it over anhydrous sodium sulfate. Filter and remove the solvent in vacuo. Dissolve the residue in tetrahydrofuran, treat with decolorizing charcoal and filter through filter aid. Remove the solvent in vacuo and dissolve the oil in chloroform. Let stand to crystallize (−10° C.), then filter the white crystalline solid to obtain 12.3 g. of the product, M.P. 172–173° C.; $[\alpha]_D + 188°$ C. (C=1, dioxane). A sample may be further purified by dissolving in hot isopropanol and diluting with water. The resulting fine white needles have a melting point of 174°–175° C.; $[\alpha]_D^{24} + 211°$ C. (C=1, dioxane);

$\lambda_{max.}^{KBr}$ 3.0 and 3.15$\mu$; $\lambda_{max.}^{EtOH}$ 222 m$\mu$ (inf.; $\epsilon$ 8,250)

EXAMPLE 12

$d(+)$-estra-1,3,5(10),7-tetraene-3,17$\beta$-diol, ($d(+)$-17$\beta$-dihydroequilin)

Add a 3 M ethereal solution of methyl magnesium iodide (60 ml.) to $d(+)$-3-methoxyestra-1,3,5(10),7-tetraen-17$\beta$-ol, formate (3.00 g.) and under argon heat the reaction to 165° C. Keep the temperature at 165–170° C. for 3 hours. Cool the reaction to about 22° C., then cool to −78° C. by immersion in a Dry Ice-acetone bath. Add tetrahydrofuran (100 ml.) and stir, then add ethyl acetate (60 ml.) and remove the bath. Continue stirring as the reaction warms up and decomposes. Small quantities of water may be added from time to time to speed up the decomposition using the cold bath to keep the temperature well below about 22° C. When the reaction is completely decomposed add water (50 ml.) then add saturated ammonium chloride solution (100 ml.) and dilute acetic acid to neutrality. Extract the mixture with ethyl acetate. Wash the extract with water and saturated sodium chloride then dry the extract over anhydrous sodium sulfate. Filter and remove the solvent in vacuo. Dissolve the resulting oil in tetrahydrofuran, treat with decolorizing charcoal and filter through filter aid. Remove the solvent in vacuo, dissolve the yellow oil in chloroform and let stand to form 1.55 g. of the product as a white crystalline solid; M.P. 170–172° C.; $[\alpha]_D^{24} + 195°$ C. (C=1, dioxane) and second crop of 0.50 g.; M.P. 165–169° C.

EXAMPLE 13

$dl$-13-ethylgona-1,3,5(10),7-tetraene-3,17$\beta$-diol

Cover $dl$-3-methoxy-13-ethylgona-1,3,5(10),7-tetraen-17$\beta$-ol (3.85 g.) with 3 molar ethereal methyl magnesium iodide (50 ml.) and under argon heat the reaction to 165° C. (oil bath). Keep the oil-bath at 165–170° C. for 3 hours then cool the reaction mixture to about 22° C. Cool the flask further by immersion in a Dry Ice-acetone bath then add tetrahydrofuran (100 ml.) and ethyl acetate (60 ml.). Remove the bath and stir until the reaction is decomposed. Add ethyl acetate (60 ml.), water (50 ml.), saturated ammonium chloride solution (100 ml.) and dilute acetic acid to neutrality. Extract the mixture with ethyl acetate, wash the extract with water and saturated sodium chloride solution then dry over anhydrous sodium sulfate. Filter, remove the solvent in vacuo and dissolve the residue in tetrahydrofuran. Treat the solution with decolorizing charcoal, filter through filter aid and remove the solvent in vacuo. Crystallize the residue from isopropanol to get 2.86 g. of product; M.P. 212–216° C. The analytical sample (from isopropanol), isolated as an isopropanol solvate melts at 218–220° C.;

$\lambda_{max.}^{KBr}$ 2.97 and 3.16$\mu$

Analysis.—Calcd. for $C_{19}H_{22}O_2 \cdot C_3H_8O$: C, 76.70; H, 9.36. Found: C, 77.11; H, 9.01.

EXAMPLE 14

$dl$-Estra-1,3,5(10),8,14-pentaene-17$\beta$-diol

Cover $dl$-3-methoxyestra-1,3,5(10),8,14-pentaen-17$\beta$-ol (5.00 g.) with 3 molar ethereal methyl magnesium iodide and heat the reaction mixture under argon to 170° C. (oil-bath). Keep the oil-bath temperature at 170° C. for 2.5 hours then cool to about 22° C. Cool the flask further by immersion in a Dry Ice-acetone bath. Add tetrahydrofuran and ethyl acetate then remove the bath. Stir to decompose the reaction then add water, saturated ammonium chloride solution and dilute acetic acid to neutrality. Extract with ethyl acetate, wash the extract with water and saturated sodium chloride solution then dry over anhydrous sodium sulfate. Filter, remove the solvent in vacuo and dissolve the residue in methanol allowing it to stand to fully crystallize. Filter the crystalline precipitate to obtain 2.07 g. of the title product as a methanol solvate; M.P. 110–113° C. (loss of methanol);

$\lambda_{max.}^{EtOH}$ 311 m$\mu$

EXAMPLE 15

The procedure of Example 1 is repeated, substituting for the methyl magnesium iodide, stoichiometrically equivalent amounts of the following Grignard reagents:

| R³MgY | |
|---|---|
| R³ | Y |
| CH₃ | Br |
| CH₃ | Cl |
| CH₃ | F |
| HC≡C | Br |
| CH₃CH₂ | Cl |
| CH₃C≡C | Br |
| F₃CCH₂CH₂ | Cl |
| H₂C=CHCH₂ | Cl |
| CH₃CH₂CH₂ | Cl |
| (CH₃)₂CH | Cl |
| H₂C=CHC≡C | Br |
| CH₃CH₂C≡C | Br |
| H₂C=CBrCH₂CH₂ | Br |
| H₂C=CHCH₂CH₂ | Br |
| H₂C=C(CH₃)CH₂ | Br |
| (CH₃)₂C=CH | Br |
| CH₃(CH₂)₂CH₂ | Cl |
| (CH₃)₃C | Br |
| CH₃(CH₂)₂CH₂ | Br |
| (CH₃)₂N—(CH₂)₄— | Cl |
| (CH₃)₂N—(CH₂)₁₀— | Cl |
| [CH₃(CH₂)₄CH₂]₂N—(CH₂)₄— | Cl |
|  | Br |
|  | Br |
|  | Br |
|  | Br |
| 3-Br-C₆H₄ | Br |
| 4-Br-C₆H₄ | Br |
| 2-Cl-C₆H₄ | Br |
| 3-Cl-C₆H₄ | Br |
| 4-I-C₆H₄ | Br |
| 3-F-C₆H₄ | Br |
| 4-F-C₆H₄ | Br |
| CH₃(CH₂)₄CH₂ | Cl |

R³MgY—Continued

| R³ | Y |
|---|---|
| 2,6-Cl₂C₆H₃ | Cl |
| 3-F-4-CH₃OC₆H₃ | Br |
| 2-CH₃C₆H₄ | Cl |
| 3-CH₃C₆H₄ | Cl |
| 4-CH₃C₆H₄ | Cl |
| 2-CH₃OC₆H₄ | Br |
| 3-CH₃OC₆H₄ | Br |
| 4-CH₃OC₆H₄ | Br |
| 2,3-(CH₃)₂-4—Br—C₆H₂ | Br |
| 2-CH₃CH₂C₆H₄ | Br |
| 4-CH₃CH₂C₆H₄ | Br |
| 2,3-(CH₃)₂C₆H₃ | Br |
| 2,4-(CH₃)₂C₆H₃ | Br |
| 2,5-(CH₃)₂C₆H₃ | Br |
| 2,6-(CH₃)₂C₆H₃ | Br |
| 3,5-(CH₃)₂C₆H₃ | Br |
| 2-CH₃CH₂OC₆H₄ | Br |
| 2-CH₃O—4—CH₃C₆H₃ | Br |
| 2,4-(CH₃O)₂C₆H₃ | I |
| 4-CH₃CH₂CH₂C₆H₄ | Br |
| 2,3,4-(CH₃)₃C₆H₂ | Br |
| 4-CH₃CH₂CH₃OC₆H₄ | Br |
| 2,6-(CH₃)₂—4—CH₃OC₆H₂ | Br |
| 4-BrC₁₀H₆—1— | Br |
| 5-BrC₁₀H₆—2— | Br |
| 4-ClC₁₀H₆—1— | Br |
| 6-ClC₁₀H₆—2— | Br |
| 1-C₁₀H₇ | Cl |
| 2-C₁₀H₇ | Br |
| 2,3,4,6-(CH₃)₄C₆H | Br |
| 4-(CH₂)₄CHC₆H₄ | Br |
| 3-CH₃(CH₂)₃CH₃C₆H₄ | Br |
| (CH₃)₅C₆ | Cl |
| 2,4,5(CH₃)₃—3,6—(CH₃O)₂C₆ | Br |
| 4-CH₃(CH₂)₄CH₂C₆H₄ | Br |
| 9-anthryl | Br |
| 9-phenanthryl | Br |
| 4-H₂C=CHC₆H₄ | Br |
| 4-HC≡CC₆H₄ | Br |
| 4-ClCH₂CH₂C₆H₄ | Br |
| 4-ClCH=CHC₆H₄ | Br |

Substantially the same results are obtained.

EXAMPLE 16

The procedure of Example 1 is repeated, substituting for the *dl*-3-methoxy-13-ethylgona-1,3,5(10)-trien-17β-ol, stoichiometrically-equivalent amounts of the aromatic steroidal ether compounds of the formula:

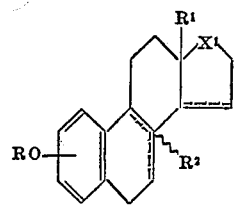

| R | R¹ | R² | X¹ | B- or D-ring unsaturation |
|---|---|---|---|---|
| 3-(CH₃)₂CH | CH₃CH | β-H | CHOH | No |
| 3-CH₃(CH₂)₄CH₂ | CH₂CH₂ | | CHOH | Δ⁷— |
| 3-CH₃ | CH₃CH₂ | | CHOCOCH₃ | Δ⁸⁽⁹⁾— |
| 3-CH₃ | CH₃CH₂ | | CHOCOCH₂(CH₂)₄CH₃ | Δ⁸⁽⁹⁾,¹⁴⁽¹⁵⁾— |
| 1-CH₃ | CH₃CH₂ | β-H | CHOH | No |
| 2-CH₃ | CH₃CH₂ | | CHOH | Δ⁷— |
| 4-CH₃ | CH₃CH₂ | | CHOH | Δ⁸⁽⁹⁾— |
| 3-CH₃ | CH₃(CH₂)₄CH₂ | | CHOH | Δ⁸⁽⁹⁾,¹⁴⁽¹⁵⁾— |
| 3-— | CH₃CH₂ | β-H | CHOH | No |
| 3-— | CH₃CH₂ | | CHOH | Δ⁷— |
| 3-— | CH₃CH₂ | | CHOH | Δ⁸⁽⁹⁾— |
| 3-— | CH₃CH₂ | | CHOH | Δ⁸⁽⁹⁾,¹⁴⁽¹⁵⁾— |

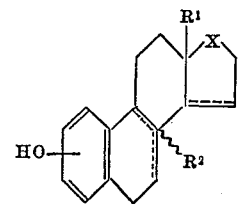

There are obtained the corresponding A-ring hydroxy-substituted 13-alkylgona-1,3,5(10)-trienes of the formula.

| A-ring Substituent | R¹ | R² | X | B- or D-ring Unsaturation |
|---|---|---|---|---|
| 3-OH | CH₃CH₂ | β-H | CHOH | No |
| 3-OH | CH₃CH₂ | | CHOH | Δ⁷— |
| 3-OH | CH₃CH₂ | | CHOH | Δ⁸⁽⁹⁾— |
| 3-OH | CH₃CH₂ | | CHOH | Δ⁸⁽⁹⁾,¹⁴⁽¹⁵⁾— |
| 1-OH | CH₃CH₂ | β-H | CHOH | No |
| 2-OH | CH₃CH₂ | | CHOH | Δ⁷— |
| 4-OH | CH₃CH₂ | | CHOH | Δ⁸⁽⁹⁾— |
| 3-OH | CH₃(CH₂)₄CH₂ | | CHOH | Δ⁸⁽⁹⁾,¹⁴⁽¹⁵⁾— |
| 3-OH | CH₃CH₂ | β-H | CHOH | No |
| 3-OH | CH₃CH₂ | | CHOH | Δ⁷— |
| 3-OH | CH₃CH₂ | | CHOH | Δ⁸⁽⁹⁾— |
| 3-OH | CH₃CH₂ | | CHOH | Δ⁸⁽⁹⁾,¹⁴⁽¹⁵⁾— |

We claim:
1. A process for the preparation of an A-Ring hydroxy-substituted 13-alkylgona (and 8-isogona)-1,3,5(10)-triene of the formula

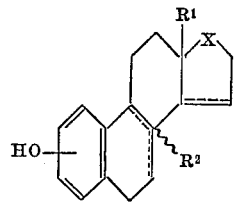

and the Δ⁷-, the Δ⁸⁽⁹⁾-, and the Δ⁸⁽⁹⁾,¹⁴⁽¹⁵⁾-dehydro analogs thereof, wherein

R¹ is (lower)alkyl and X is hydroxymethylene,
R² is hydrogen or hydroxy, the symbol (⫶) indicates α- or β-configuration, and the broken lines indicate unsaturation in said analogs, which comprises cleaving the A-ring ether group of a corresponding aromatic steroidal ether compound of the formula:

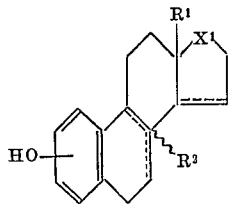

wherein
X¹ is hydroxymethylene or (lower)acyloxymethylene,
R¹ and R² are as defined above and R is (lower)alkyl or cyclo(lower)alkyl, by heating said steroidal ether with a Grignard reagent at temperatures above the range of from about 80° C. to about 100° C., until cleavage of the A-ring ether group is substantially complete, and recovering said A-ring hydroxy-substituted compound.

2. A process as defined in claim 1 wherein said Grignard reagent is a (lower)alkyl magnesium halide.

3. A process as defined in claim 2 wherein said (lower)alkyl magnesium halide is methyl magnesium bromide or methyl magnesium iodide.

4. A process as defined in claim 1 wherein said Grignard reagent is methyl magnesium iodide and the heating is carried out at a minimum temperature in the range of from about 140° C. to about 170° C.

5. A process as defined in claim 1 wherein said Grignard reagent is methyl magnesium bromide and the heating is carried out at a minimum temperature in the range of from about 160° C. to about 185° C.

6. A process as defined in claim 1 wherein dl-13-ethylgona-1,3,5(10)-triene-3,17β-diol is prepared by reacting dl-3-methoxy-13-ethylgona-1,3,5(10)-trien-17β-ol with methyl magnesium iodide at a temperature in the range of from about 145° C. to about 170° C.

7. A process as defined in claim 1 wherein dl-13-ethyl-8α-gona-1,3,5(10)-triene-3,17β-diol is prepared by reacting dl-3-methoxy-13-ethyl-8α-gona-1,3,5(10)-trien-17β-ol with methyl magnesium iodide at a temperature in the range of from about 145° C. to about 170° C.

8. A process as defined in claim 1 wherein dl-estra-1,3,5(10)-triene-3,8,17β-triol is prepared by reacting dl-3-methoxyestra-1,3,5(10)-triene-8,17β-diol with methyl magnesium bromide at a temperature in the range of from about 160° C. to about 185° C.

9. A process as defined in claim 1 wherein dl-estra-1,3,5(10)-triene-3,8,17β-triol is prepared by reacting dl-3-methoxyestra-1,3,5(10)-triene-8,17β-diol with methyl magnesium iodide at a temperature in the range of from about 145° C. to about 170° C.

10. A process as defined in claim 1 wherein dl-estra-1,3,5(10),8-tetraene-3,17β-diol is prepared by reacting dl-3-methoxyestra-1,3,5(10),8-tetraen-17β-ol with methyl magnesium iodide at a temperature in the range of from about 145° C. to about 170° C.

11. A process as defined in claim 1 wherein d-estra-1,3,5(10),8-tetraene-3,17β-diol is prepared by reacting d(—)-3-methoxyestra-1,3,5(10),8-tetraen-17β-ol with methyl magnesium iodide at a temperature in the range of from about 145° C. to about 170° C.

12. A process as defined in claim 1 wherein dl-13-ethylgona-1,3,5(10),8-tetraene-3,17β-diol is prepared by reacting dl-3-methoxy-13-ethylgona-1,3,5(10),8-tetraen-17β-ol with methyl magnesium iodide at a temperature in the range of from about 145° C. to about 170° C.

13. A process as defined in claim 1 wherein dl-estra-1,3,5(10),7-tetraene-3,17β-diol is prepared by reacting dl-3-methoxyestra-1,3,5(10),7-tetraen-17β-ol with methyl magnesium bromide at a temperature in the range of from about 160° C. to about 185° C.

14. A process as defined in claim 1 wherein dl-estra-1,3,5(10),7-tetraene-3,17β-diol is prepared by reacting dl-3-methoxyestra-1,3,5(10),7-tetraen-17β-ol with methyl magnesium iodide at a temperature in the range of from about 145° C. to about 170° C.

15. A process as defined in claim 1 wherein d(+)-estra-1,3,5(10),7-tetraene-3,17β-diol is prepared by reacting d(+)-3-methoxyestra-1,3,5(10),7-tetraen-17β-ol with methyl magnesium iodide at a temperature in the range of from about 145° C. to about 170° C.

16. A process as defined in claim 1 wherein d(+)-estra-1,3,5(10),7-tetraene-3,17β-diol is prepared by reacting d(+)-3-methoxyestra-1,3,5(10),7-tetraen-17β-ol, formate, with methyl magnesium iodide at a temperature in the range of from about 145° C. to about 170° C.

17. A process as defined in claim 1 wherein dl-13-ethylgona-1,3,5(10),7-tetraene-3,17β-diol is prepared by reacting dl-3-methoxy-13-ethylgona-1,3,5(10),7-tetraen-17β-ol with methyl magnesium iodide at a temperature in the range of from about 145° C. to about 170° C.

18. A process as defined in claim 1 wherein dl-estra-1,3,5(10),8,14-pentaene-3,17β-diol is prepared by reacting dl-3-methoxyestra-1,3,5(10),8,14-pentaen-17β-ol with methyl magnesium iodide at a temperature in the range of from about 145° C. to about 170° C.

No references cited.

HENRY A. FRENCH, *Primary Examiner.*

U.S. Cl. X.R.
424—238

UNITED STATES PATENT OFFICE
CERTIFICATE OF CORRECTION

Patent No. 3,436,411                                      April 1, 1969

Reinhardt P. Stein et al.

It is certified that error appears in the above identified patent and that said Letters Patent are hereby corrected as shown below:

Column 8, line 4, "di" should read -- dl --. Column 9, line 17, after "filter," insert -- wash with petroleum ether and air-dry the resulting --. Column 15, lines 7 to 17, the formula should appear as shown below:

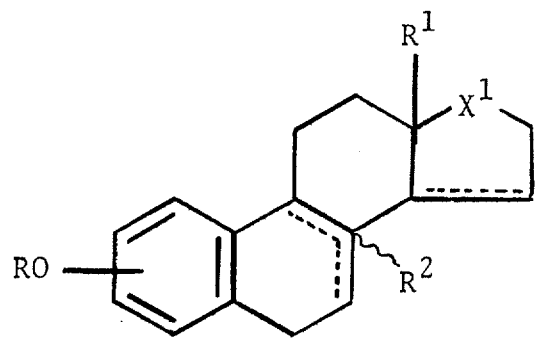

Signed and sealed this 7th day of April 1970.

(SEAL)
Attest:

EDWARD M. FLETCHER, JR.                    WILLIAM E. SCHUYLER, JR.
Attesting Officer                          Commissioner of Patents